No. 756,350. PATENTED APR. 5, 1904.
F. A. GARBUTT.
HOSE MENDER.
APPLICATION FILED OCT. 26, 1901.
NO MODEL.
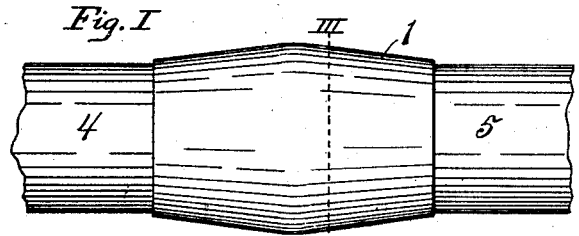
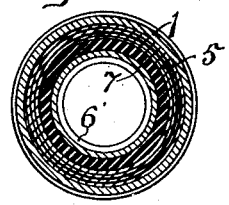
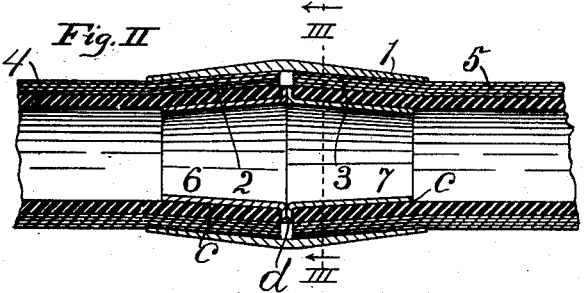
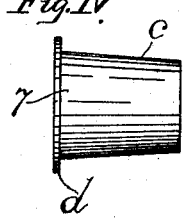
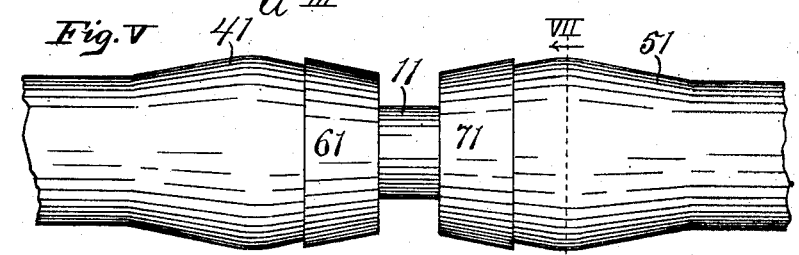
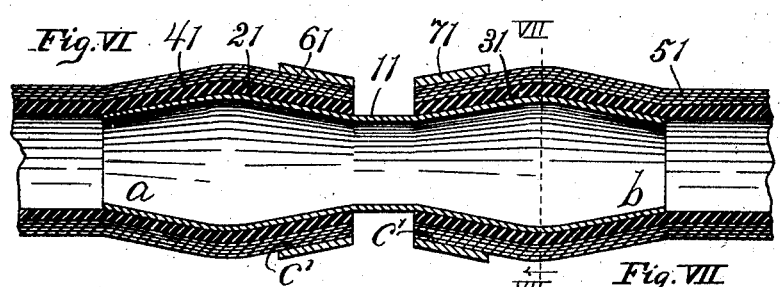
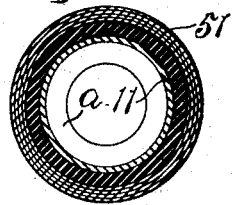
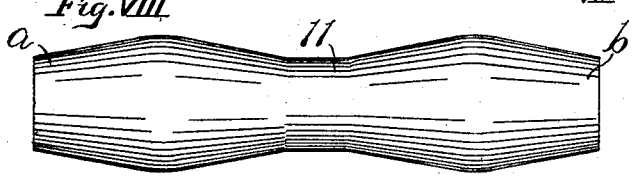
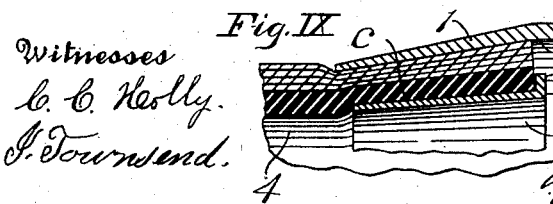
Witnesses
C. C. Kelly.
J. Townsend.
Inventor
Frank A. Garbutt
Townsend Bros
his attys No. 746,350.

Patented April 5, 1904.

UNITED STATES PATENT OFFICE.

FRANK A. GARBUTT, OF LOS ANGELES, CALIFORNIA.

HOSE-MENDER.

SPECIFICATION forming part of Letters Patent No. 756,350, dated April 5, 1904.

Application filed October 26, 1901. Serial No. 80,131. (No model.)

*To all whom it may concern:*

Be it known that I, FRANK A. GARBUTT, a citizen of the United States, residing at Los Angeles, in the county of Los Angeles and State of California, have invented a new and useful Hose-Mender, of which the following is a specification.

It is a common experience that hose used for sprinkling lawns, irrigating gardens, and for like purposes is apt to become worn and broken at places, while the greater part of the hose is in good condition. The hose thus damaged can readily be mended by cutting out the broken portion and uniting the remaining sound portions.

The object of this invention is to provide means whereby the ends of hose-sections can be positively, firmly, and perfectly united at a very moderate cost and when united will be as strong and even stronger at the mended places than when new.

My invention comprises, broadly, three separate and independent hollow members, two of which are frusto-conical and the other one tapers in opposite directions. The hose-engaging faces of these members are preferably smooth, which will facilitate the insertion of the ends of the hose between the members and will also permit of a slight movement of the hose outward, which will cause the coacting members to grip the ends of the hose with an increasing pressure as the outward movement continues, but which will quickly become so great that it will be impossible to move the parts farther and will also prevent the possibility of leakage at the joint.

This hose member is constructed in three separate and unitary hollow shell-like members, one of which comprises a double frusto-conical shell and the others are each in the form of a frusto-conical shell, the larger ends thereof, respectively, being adjacent an enlarged portion of the first-named member. By this construction the abutting ends of the hose-section to be fastened together may be embraced and positively held by the members and a neat appearance be given the mended section. At the same time this construction affords a most simple, cheap, strong, permanent, and readily-applied mender for a hose.

The principle of this invention may be embodied in various ways, and in the accompanying drawings I have illustrated two forms of hose mender or coupling, the same being the best forms in which I at present contemplate embodying the invention.

Figure I is a view showing one form of this newly-invented hose-mender in use connecting two hose ends. The hose-engaging faces of the connecting member fit the outside of the hose ends. Fig. II is an axial section of the hose-mender and hose ends shown in Fig. I. Fig. III is a cross-section on line indicated by III III, Figs. I and II, looking in the direction of the arrows. Fig. IV is an elevation of the ferrule shown in Figs. I, II, and III. Fig. V is a view of the invention in another form of its embodiment connecting two hose ends. In this form the hose-engaging faces of the connecting member fit the inside of the hose ends. Fig. VI is an axial section of the form shown in Fig. V. Fig. VII is a section on line indicated by VII VII, Figs. V and VI, looking in the direction of the arrows. Fig. VIII is an elevation of the hollow hose-connecting member employed in the form shown in Figs. V and VI. Fig. IX is an exaggerated fragmental detail to show the dovetailing of the hose end between the connecting member and the ferrule.

First referring to the forms illustrated in Figs. I, II, III, and IV, 1 designates the hollow hose-end-connecting member, furnished with internal hose-engaging faces 2 and 3, respectively, within which the hose ends 4 and 5, respectively, fit. These hose-engaging faces are of frusto-conical form and taper in opposite directions toward the opposite ends of the member 1. 6 and 7 designate two ferrules, which respectively taper toward one end in approximate correspondence to the opposite taper of the hose-engaging faces 2 and 3, respectively. Preferably the taper of the hose-engaging faces *c* of the ferrules 6 and 7, respectively, is slightly less than the taper of the hose-engaging faces 2 3 of the connecting member 1, against which the ferrules are to press the hose, and the ferrules 6 and 7 are each of a less length than half the length of the outer member 1, whereby a dovetail fastening is effected, as indicated in Fig. IX. To apply this form of hose-mender, the ferrules 6 and 7 will be started into the hose ends 4 and 5, respectively, and one of said hose ends will then be inserted into the connecting member 1 from one end thereof and brought approximately to the middle of the connecting member. Then the other hose end, with its ferrule started thereinto in a like manner, will be inserted into the other end of the hollow connecting member 1 and will be pushed in, thereby bringing the projecting ends of the ferrules 6 and 7 into contact with each other, whereupon the hose ends will be forced upon said ferrules, respectively, thereby firmly wedging the hose ends respectively against the hose-engaging faces 2 and 3. When the hose ends are thus forced into the member 1 and upon the ferrules 6 and 7, the hose ends are respectively spread outward to fill the space between their respective ferrules and the member 1, thereby preventing any accidental disconnecting of the hose ends from each other. The joint thus formed between the hose ends and the connecting member 1 will be water-tight and strong.

In the form shown in Fig. V the hose-engaging faces 21 and 31 decrease in diameter toward the middle of the member 11, and the hose ends 41 and 51 are fitted upon the outside of the member 11, and the ferrules 61 71 fit upon the outside of the hose ends and taper toward one end respectively.

In practice the member 11 will be inserted into the hose ends, and the hose ends will be brought near to the middle of the member 11, upon which the ferrules 61 and 71 have first been applied. Then said ferrules will be forced into position (shown in Figs. V and VI) to press the hose firmly upon the swelled portion of the member 11.

Preferably the member 11 tapers at its ends, as indicated at *a b* in Figs. VI and VIII, so that it may be readily inserted into the hose ends.

The taper of the hose-engaging faces *c* and *c'*, respectively, is less than that of the corresponding hose-engaging faces of the connecting members, respectively, in order that when the parts of the mender are in position connecting the hose ends said hose ends will be more compressed at a distance from the end than they are at the immediate ends of the hose, thus producing a dovetail at the end of the hose, which prevents the hose from being withdrawn from the connecting member.

*d* designates flanges on the ends of the ferrules 6 and 7, respectively, to prevent the ferrule from inserting too far into its hose end.

In manufacturing my improved hose-mender I prefer to make the parts from thin material, as tubing, as it can easily be pressed into shape, as by spinning. The hose-engaging faces of the coacting parts of the mender may be perfectly smooth, as the different tapers of said parts, in addition to the main taper, will hold the hose between them with an ever-tightening grip as the parts of the hose are attempted to be separated. To assemble the parts, it is evident that the interior element must be of a less size at its largest diameter than the smallest diameter of the exterior part to permit of the insertion of the interior member into the exterior one.

In each of the above-described forms of the invention the outer hose-engaging means, whether consisting of a single member, as shown in Figs. I to IV, or of two members, as shown in Figs. V to VIII, serves to cover the end portion of the hose, and the inner hose-engaging means, consisting of the ferrules 6 and 7 in Figs. I to IV or of member 11 in Figs. V to VIII, serves to grip the ends of the hose against such outer means.

What I claim, and desire to secure by Letters Patent of the United States, is—

1. A hose-mender comprising outer hose-engaging means adapted to cover the end portions of the hose, and inner hose-engaging means adapted to engage with and grip the end portions of the hose, one of such hose-engaging means being a unitary member and having oppositely-tapering frusto-conical faces, and the other hose-engaging means consisting of two members having frusto-conical faces of less taper than the aforesaid faces of the other member and tapering in the same direction as said faces.

2. In a hose-mender three separate and unitary hollow smooth-walled shell-like members one of which comprises a double frusto-conical shell, and the others are each in the form of a frusto-conical shell of less taper, with the larger ends thereof respectively adjacent an enlarged portion of the first-named member.

3. In a hose-mender, three separate and unitary, hollow, shell-like members, two of which are frusto-conical and each of a less length than half the length of the other member and said other member tapers in opposite directions, the taper of the exterior member being greater toward each end than the coacting interior member, whereby the hose is under greater compression at a distance from its end than it is at the end, and said compression rapidly increasing as the members are moved longitudinally relatively to each other in trying to separate the ends of the hose.

4. In a hose-mender, three separate and unitary, smooth-walled hollow shell-like members, the outer one of which has its greatest diameter at the center and tapers toward each end and the inner members each tapers from one end to the other, the larger ends being located within the larger diameter of the outer member and abutting against each other, whereby the ends of the hose will be automatically held between the inner members and the outer member.

5. In a hose-mender, three separate and smooth-walled hollow shell-like members, the outer one of which has its greatest diameter at the center and tapers toward each end and the inner members each tapers from one end to the other, the larger ends of said inner members being flanged and located within the larger diameter of the outer member said flanges abutting against each other whereby the ends of the hose may be automatically held between said inner members and the outer member and in engagement with said flanges.

6. In a hose-mender, three hollow, smooth-walled shell-like members, the outer one of which overlaps the inner members and is in the form of a double frusto-conical shell, and the inner members are each in the form of a frusto-conical shell, with a less taper toward the smaller end than the taper of the outer member, the larger ends of said inner members, being flanged and abutting against each other at the middle of the outer member.

7. A hose-mender comprising two frusto-conical inner members, and a unitary double and frusto-conical outer member adapted to cover and grip the end portions of the hose between the inner and outer members.

8. In a hose-mender, three separate and unitary, smooth-walled hollow shell-like members, the outer one of which has its greatest diameter at the center and tapers toward each end and the inner members each tapering from one end to the other, the larger ends being located within the larger diameter of the outer member, whereby the ends of the hose will be automatically held between the inner members and the outer member.

9. In a hose-mender, three separate and unitary, hollow, shell-like members, two of which are frusto-conical and each of a less length than half the length of the other member, and said other member tapers in opposite directions, the taper of the exterior member being greater toward each end than the coacting interior member, whereby the hose is under greater compression at a distance from its end than it is at the end, and said compression rapidly increasing as the members are moved longitudinally relatively to each other in trying to separate the ends of the hose.

10. In a hose-mender, three separate and unitary, smooth-walled hollow shell-like members, the outer one of which has its greatest diameter at the center and tapers toward each end and the inner members each tapers from one end to the other, the larger ends being located within the larger diameter of the outer member and abutting against each other, whereby the ends of the hose will be automatically held between the inner members and the outer member.

11. In a hose-mender, three separate and smooth-walled hollow shell-like members, the outer one of which has its greatest diameter at the center and tapers toward each end and the inner members each tapers from one end to the other, the larger ends of said inner members being flanged and located within the larger diameter of the outer member, said flanges abutting against each other, whereby the ends of the hose may be automatically held between said inner members and the outer member and in engagement with said flanges.

12. In a hose-mender, three hollow, smooth-walled shell-like members, the outer one of which overlaps the inner members and is in the form of a double frusto-conical shell, and the inner members are each in the form of a frusto-conical shell, with a less taper toward the smaller end than the taper of the outer member, the larger ends of said inner members, being flanged and abutting against each other at the middle of the outer member.

In testimony whereof I have signed my name to this specification, in the presence of two subscribing witnesses, at Los Angeles, California, this 21st day of October, 1901.

FRANK A. GARBUTT.

Witnesses:
 JAMES R. TOWNSEND,
 JULIA TOWNSEND.